(No Model.)

A. G. TISDELL.
PHOTOGRAPHIC SHUTTER.

No. 536,242. Patented Mar. 26, 1895.

Witnesses
Ralph D. Mershon
Hilbert C. Fener

Abner G. Tisdell, Inventor
By his Attorney H. S. MacKaye

UNITED STATES PATENT OFFICE.

ABNER G. TISDELL, OF SCRANTON, PENNSYLVANIA, ASSIGNOR TO THE TISDELL CAMERA AND MANUFACTURING COMPANY, OF SAME PLACE.

PHOTOGRAPHIC SHUTTER.

SPECIFICATION forming part of Letters Patent No. 536,242, dated March 26, 1895.

Application filed June 14, 1893. Serial No. 477,577. (No model.)

*To all whom it may concern:*

Be it known that I, ABNER G. TISDELL, a citizen of the United States, residing in the city of Scranton, county of Lackawanna, and State of Pennsylvania, have made a new and useful Improvement in Shutters for Photographic Cameras, of which the following is a specification.

My invention relates to shutters for any form of photographic camera, and is particularly designed for use with such portable cameras as require simple operating means.

One object of my invention is to provide a form of shutter capable of use either for giving a time exposure or for instantaneous purposes.

A further object of my invention is to provide a shutter capable of the above uses, and operated by a single push lever when used for either kind of exposure.

A further object of my invention is the provision of a shutter capable of use for either instantaneous or time exposures, and having a quick movement for the former, and a slower movement for the latter use.

My invention also includes other details, fully disclosed in the following specification and claims.

The invention is illustrated in the accompanying drawings, in which—

Figure 1:
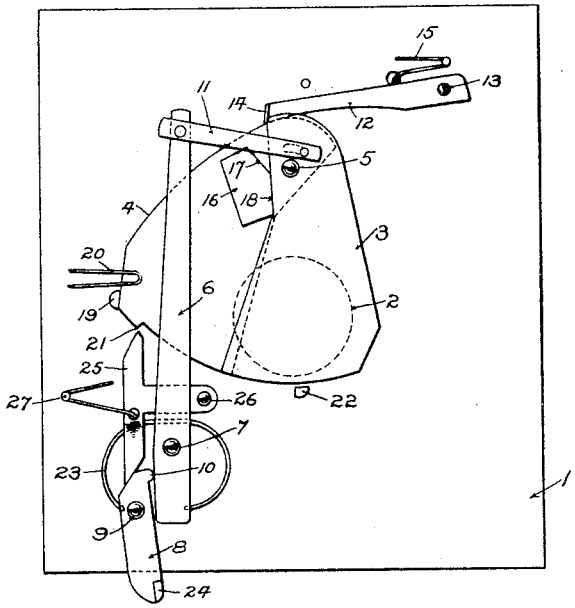
Figure 2:
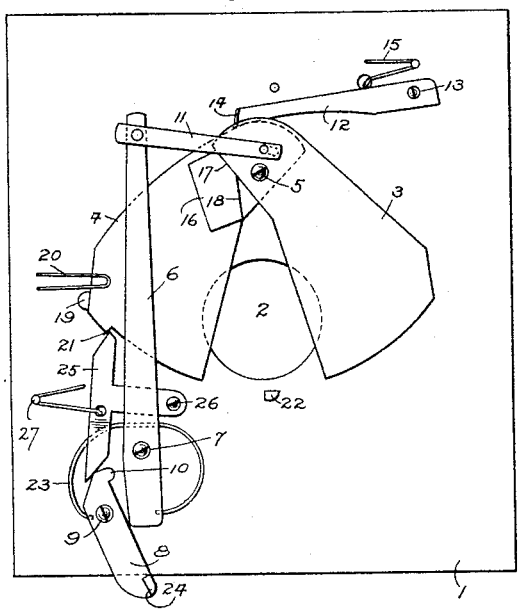
Figure 3:
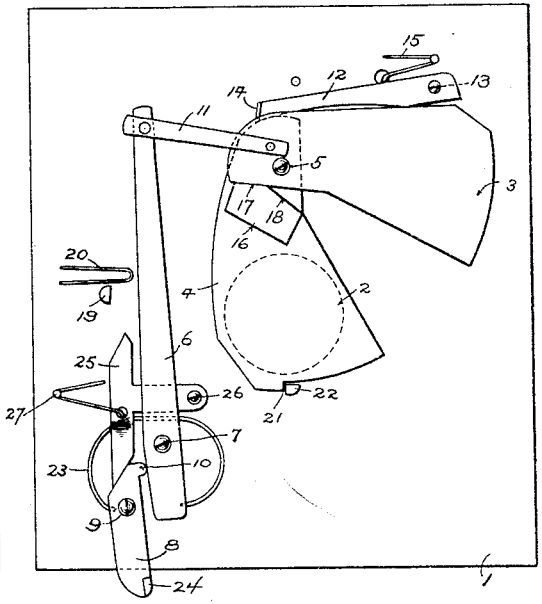

Figure 1 is an elevation of my shutter as seen from within the camera, when closed. Fig. 2 is a similar view thereof, when open for a time exposure; and Fig. 3 is a view of the same when fully thrown after instantaneous exposure.

In describing my invention, I shall first explain the fundamental elements of the broad or generic invention embodied in all the forms which such invention may take, and shall then proceed to describe the best form in which I have hitherto embodied said invention.

My invention broadly or generically considered contemplates the use of a two-part shutter, one of the parts of which is moved by the other, as the latter is actuated in either direction. The form of these parts, their size and direction or kind of movement, are secondary considerations, bearing only upon specific embodiment of this generic organization.

The drawings show the best specific form which I have hitherto devised for my invention, and this is described hereinafter.

In the drawings, the camera front is shown at 1, and the light opening is indicated by the dotted circle 2.

In the construction illustrated, 4 is the wing which is moved by the directly operated wing 3. The latter I term the leading wing, while the wing 4 is called the following wing.

In the specific form shown, I employ the throwing lever 6, pivoted as at 7, and moved by the push lever 8, which is itself shown pivoted at 9. The pivot 9 should be so placed with relation to the end of the lever 6, that when the push lever 8 is pressed in one direction, it will impinge upon the end of said lever below the pivot 9, and when the button is oppositely actuated, it will bring its projection 10 into contact with said lever. In any case the point of contact should be below the fulcrum 7 of the lever, where the specific embodiment of my invention herein illustrated is employed. Of course the word "below" as here used is intended to indicate that end of the lever unattached to the shutter.

The end of the long arm of the lever 6 is pivotally connected with the wing 3, above its fulcrum 5, by means of the bar 11, or otherwise, whereby motion may be communicated from said lever to said shutter wing.

The wing 3 is restrained from leaving the position shown in Fig. 1, by means of the pawl 12, pivoted at 13, and provided at its free end with a projection or hook, 14. This hook normally engages the shoulder of the wing 3, and is arranged sloping with relation to the direction of movement of said shoulder. In other words the surfaces of contact of hook and shoulder are not parallel.

The spring 15 presses upon the pawl 12, and determines the degree of tension which must be exerted upon the shutter before it can be moved. Methods whereby the force of a given spring may be varied being well known to mechanics, this spring supplies one means whereby a variable restraining force may be applied to the shutter.

As indicated by the dotted lines in Fig. 1, the wing 3 overlaps the wing 4, but there is secured to one side of the latter, and in the same plane as the wing 3, an abutment or bearing plate 16, whose two bearing edges, 17 and 18 are set at an angle.

The stop 19 limits the movement of the wing 4 toward the left, and, in order to prevent rebound, and to firmly secure said wing in its normal position, I employ a frictional retaining piece, such as the spring 20.

It will be seen that I have thus far described all the elements necessary for the crude manipulation of the specific embodiment of my shutter herein shown. It will be seen hereinafter, however, that my specific invention also includes certain supplementary devices, calculated to render the operation of this shutter more certain and convenient.

Such a shutter as has been thus far described would be operated as follows: Upon pressing the lower end of the lever 6 to the left with a gradually increasing force, the wing 3 would tend to be moved toward the right, by means of the bar 11. When the force exerted became sufficient to overcome the spring 15, and raise the pawl 12, the wing 3 would be released, and would fly suddenly across the opening 2, into the position shown in Fig. 3. Before it had reached this position, however, and when in the position shown in Fig. 2, the upper part of the wing 3 would come in contact with the surface 17 of the abutment 16, and, striking a quick blow thereon, would cause the wing 4 to swing on its pivot with a snap, until the shoulder 21 thereon came in contact with the stop 22, or until by any desired device, said wing were stopped. When in this position the opening is covered by the wing 4. The results of these successive movements is a quick uncovering and subsequent covering of the opening 2, such as is necessary in an instantaneous exposure. Supposing the wing 3 to be so balanced as to naturally hang in the position shown in Fig. 1, it is conceivable that on being released, it might return the whole shutter to its normal position; or, if necessary, the lever 6, by being reversely pressed, could be made to first cause 3 to fall upon and overlap the wing 4, and by further movement, transmitted through the abutment 16, force said leaf back against its stop 19. This return, it will be observed, is accomplished without admission of light. Neither of the above-mentioned methods of return is, however the most convenient. In the best form of my invention I make my shutter self setting and at the same time light, speedy and sure in action. For this purpose I employ a spring or springs to normally hold all the parts in the position shown in Fig. 1. As it is desirable to keep the push lever and lever in contact to prevent rattling, I use some such spring as I have shown in the drawings. This is simply a steel or other metal bow 23, having its two ends bearing respectively upon the push-lever 8 and the lower end of the lever 6.

I have thus far described the mode of operation for instantaneous exposures, and I would call attention to the fact that the desired movement of the lever 6 may be imparted by moving the push lever 8 in either direction, but that, as a quick movement is wanted for instantaneous exposures, it should be imparted by bringing the projection 10 against the lever, as a greater multiplication of speed by leverage is thereby obtained. The movement by means of swinging the button in the opposite direction is reserved for producing time exposures which I shall now proceed to describe.

The instantaneous exposure movement being obtained by pressing the thumb piece 24 to the left, as shown in the drawings, the same movement of the lever, but a slower one, is imparted for time exposures by the opposite movement of the thumb piece. Since the lever is moved precisely as in instantaneous work, the same result would be produced upon the wings 3 and 4, were not some means supplied for arresting their movement at the point shown in Fig. 2. For this purpose many means might be devised, and I wish it understood that my invention contemplates the use of any kind of stopping device whereby one of two moving wings may be kept from movement upon contact with the other when in motion.

In the specific form of my invention herein shown, this arresting of movement is accomplished by means of a safety stop, actuated by the projection 10 of the push lever, in its reverse movement. This stop is shown at 25, and, although various forms might be given it, I have thus far found the best to be a T shaped piece, pivoted as shown at 26, having its upper arm shaped to receive the direct thrust of the shoulder 21, and its lower arm adapted to receive the cam action of the back of the beak 10. This latter cam action serves to swing the whole stop upward, and the parts are so proportioned that, by the time the movement of the lever 6 has brought the upper part of the wing 3 against the surface 17, the upper arm of the safety stop has been moved into the path of the shoulder 21, whereby the wing 4 is prevented from appreciable movement. As long as pressure is exerted upon the thumb piece 24 toward the right, the wings will be rigidly held in the position shown in Fig. 2, and the time exposure will continue. When this pressure is released, the spring 23 will quickly restore the wings to their normal positions. Upon this return the safety stop resumes its former place impelled either by gravity, or a spring as 27, or both; thus leaving the wing 4 free to swing across the opening 2, if desired.

It will thus be seen that, by using the various features of my invention, one may obtain a self-setting shutter, capable of adjustment, and actuated by a single push lever, which, upon movement in one direction, will give an instantaneous exposure with a quickly moving shutter, and upon movement in the opposite direction will give a time exposure of any desired duration, with a slower movement of shutter. These advantages are all attained by me, through the use of simple, cheap, and durable means.

Of course my invention, both generically and specifically considered, is capable of many modifications, and colorable changes, which would not involve departure from the spirit thereof. Some examples of these I shall indicate below.

I have shown the wings pivoted above the opening, but I do not consider my invention limited to the use of wings so pivoted, or indeed to wings pivoted in any manner. They might be arranged to move according to any well known law, and still be broadly within the spirit of my invention.

The leading wing may be moved in any desired manner, as by a string, rod or lever for positive actuation, or by a spring, where apparatus requiring setting is used.

Although the use of the push lever 8 has marked advantages as has been shown, it may be dispensed with, in modification of my generic invention, and the throwing lever directly moved. Furthermore, the parts 12, 19 and 20 are not absolutely essential to operation.

Of course it will be understood that the exact shape, position and materials of the various springs employed by me may be indefinitely varied to suit the judgment of the constructor. It may also be found advantageous to use the form of device for preventing rebound shown in my Patent No. 464,260, dated December 1, 1891.

What I claim is—

1. A shutter for photographic cameras consisting of two pivoted wings, one of said wings being moved after and by contact with the other in both exposure and return; and means for automatically returning said wings, substantially as described.

2. In a camera shutter a following and a leading wing, swinging upon a common pivot, said leading wing overlapping said following wing; and an abutment borne by the following wing, and having two edges at an angle with each other, with each of which the edge of the leading leaf is arranged to coincide in its extreme positions, substantially as described.

3. In a camera shutter, a pivoted actuating lever, a push lever for moving said actuating lever, and a spring bow having one end bearing on said push lever and the other end bearing on said actuating lever, substantially as described.

4. In a camera shutter, leading and following wings, means whereby one wing actuates the other after exposure, and a movable stop preventing movement of the following wing when in one position, substantially as described.

5. In a camera shutter, leading and following wings, means whereby one wing actuates the other after exposure, and a movable stop capable of movement by the operating means whereby it is moved into engagement with said following wing, substantially as described.

6. In a camera shutter, a leading and a following wing, said following wing having a stop shoulder whereby it is caused to be moved by said leading wing after exposure; a pivoted actuating lever, connected to said leading wing at one end, a pivoted push lever adapted to make contact with the other end of said actuating lever, on either side of the fulcrum of said push lever, and a pivoted safety stop situated in the path of movement of the projection of said push lever, so as to be swung by reverse movement thereof into engagement with the shoulder on said following wing, substantially as described.

In testimony whereof I have hereunto subscribed my name this 25th day of May, A. D. 1893.

ABNER G. TISDELL.

Witnesses:
WM. F. BOYLE,
H. E. STILLWELL.